United States Patent [19]

Fiorenza

[11] Patent Number: 5,038,064
[45] Date of Patent: Aug. 6, 1991

[54] LIMITED ANGLE ROTARY ACTUATOR

[75] Inventor: John A. Fiorenza, Slinger, Wis.

[73] Assignee: Briggs & Stratton Corporation, Wauwatosa, Wis.

[21] Appl. No.: 576,358

[22] Filed: Aug. 31, 1990

[51] Int. Cl.⁵ .................. H01F 7/18; H02K 21/18
[52] U.S. Cl. ................... 310/116; 310/156; 310/166; 335/272
[58] Field of Search ............ 310/116, 156, 49 R, 310/266; 335/272

[56] References Cited

U.S. PATENT DOCUMENTS

| | | |
|---|---|---|
| 3,214,662 | 10/1965 | Wolf . |
| 3,278,875 | 10/1966 | McDonough ............... 335/272 |
| 3,435,395 | 3/1969 | Rosenberg et al. . |
| 3,644,763 | 2/1972 | Skrobisch . |
| 3,694,782 | 9/1972 | Ray ............................ 335/272 |
| 3,949,250 | 4/1976 | Walker et al. . |
| 3,970,979 | 7/1976 | Montagu . |
| 4,227,164 | 10/1980 | Kitahara ....................... 335/272 |
| 4,246,504 | 1/1981 | Clifford et al. ............... 310/154 |
| 4,275,371 | 6/1981 | Vogel ............................ 335/272 |
| 4,447,793 | 5/1984 | Gray . |
| 4,491,815 | 1/1985 | Idogaki et al. . |
| 4,510,403 | 4/1985 | Vanderlaan et al. . |
| 4,600,864 | 7/1986 | Sato ............................. 310/156 |
| 4,612,526 | 9/1986 | Vanderlaan et al. . |
| 4,724,811 | 2/1988 | Maisch . |
| 4,779,069 | 10/1988 | Brown ......................... 310/156 |
| 4,804,934 | 2/1981 | Finke et al. ................... 335/272 |
| 4,816,707 | 3/1989 | Vanderlaan . |
| 4,850,322 | 7/1989 | Uthoff et al. . |
| 4,868,434 | 9/1989 | Hayashi ....................... 310/266 |
| 4,889,073 | 3/1990 | Takeuchi et al. . |
| 4,938,190 | 7/1990 | McCabe . |

FOREIGN PATENT DOCUMENTS 1236085  6/1960  France ................... 335/272

OTHER PUBLICATIONS

Fleisher, William A., Brushless Motors for Limited Rotation, Machinery Design, 12-07-89.
Cooper, William David, Electronic Instrumentation and Measurement Techniques, Second, Edition, Chapter 4, 1978.

Primary Examiner—Steven L. Stephan
Assistant Examiner—D. L. Rebsch
Attorney, Agent, or Firm—Andrus, Sceales, Starke & Sawall

[57] ABSTRACT

A limited angle torque actuator produces a substantially constant torque over an excursion angle of 90 degrees or more. The actuator uses a core made from a highly permeable magnetic material such as soft iron. In a preferred embodiment, one or more permanent magnets are attached to the outer surface of the cylindrical core. In another embodiment, the permanent magnets are spaced apart from a stationary core to create an air gap therebetween. When current flows through a coil wound on the stator, first and second stator poles are created which interact with the permanent magnets to rotate the rotor assembly.

10 Claims, 1 Drawing Sheet

LIMITED ANGLE ROTARY ACTUATOR

BACKGROUND OF THE INVENTION

This invention relates to rotary actuators, and more particularly to limited angle actuators such as limited angle torque (LAT) motors and rotary solenoids.

Rotary actuators are known which provide torque over a predetermined angle. Typical prior art actuators have a rotor including permanent magnets and a stator that supports armature windings. Although conventional brushless motors are constructed in a similar manner to limited angle torque (LAT) actuators and motors, LAT actuators are typically wound in single phase to eliminate the need for commutation circuitry. Conventional brushless motors are typically wound for two or three-phase operation.

Two basic designs of LAT motors are known in the prior art. In the slotted-armature LAT motor, the armature windings are embedded in slots around the inside periphery of a laminated stator.

In the torroidally-wound LAT motor, the coils are torroidally wound on a slotless stator. The rotor carries one or more permanent magnets which interact with the magnetic field created by the current-carrying coils to produce torque over a limited excursion angle. In a typical prior art device, the excursion angle is about 45 degrees or less.

One disadvantage of such prior art LAT actuators is that the torque they produce is constant only over a very limited range. The torque is inversely proportional to the distance or "air gap" between the stator's magnetic poles and the magnetic poles of the permanent magnet carried on the rotor. As the rotor rotates to move a permanent magnet pole away from a stator pole, a smaller portion of the stator's flux is transmitted to the permanent magnet's pole, thereby decreasing the torque output. This decrease in torque output also limits the actuator's excursion angle.

One attempt to remedy this problem is disclosed in U.S. Pat. No. 3,694,782 issued Sept. 26, 1972 to Ray. In the '782 Ray patent, the permanent magnet on the rotor has peripheral segments of highly permeable material attached thereto. These segments or shoes may have a tapered or wrapped design to increase the amount of permeable material that receives magnetic flux from the stator as the permanent magnet pole moves away from the section of the stator having the highest flux density.

However, the actuator in the Ray patent still has several disadvantages. First, the Ray excursion angle is limited to between about 40 degrees to 55 degrees. Second, the Ray design still does not provide constant torque over a wide range.

SUMMARY OF THE INVENTION

In its broadest form, the actuator according to the present invention includes a core made from a highly permeable magnetic material, a stator having first and second stator sections, a permanent magnet means, and an electrical means for magnetizing the first and second stator sections to create a first stator pole of a first polarity and a second stator pole of a second polarity.

In operation, a rotating means rotates the permanent magnet means from a first position to a second position. The first magnet pole of the permanent magnet means has a first polarity and is attracted to the second stator pole. The first magnet pole is repelled by the first stator pole. Likewise, the second magnet pole of the permanent magnet means has a second polarity, and is attracted to the first stator pole. The second magnet pole is repelled by the second stator pole.

In a preferred embodiment, the permanent magnet means is attached to the outer, peripheral surface of the core, and may include either two arcuate permanent magnets or a ring magnet. In another embodiment, the core is stationary, and the permanent magnet means is attached to and rotated by the rotating means. In the latter embodiment, the permanent magnet means is spaced from the outer surface of the core, creating an air gap between the permanent magnet and the core. The presence of this air gap reduces the inertia of the rotating components to provide a quicker response.

The electrical means may consist of a single coil wrapped on the stator that is in magnetic flux communication with the first and second stator sections. Alternatively, the electrical means may consist of a first coil in magnetic flux communication with the first stator section, and a second coil connected in series with the first coil and in magnetic flux communication with the second stator section.

The core is made of a highly permeable material such as soft iron, cold rolled steel or powdered metal, to permit magnetic flux from the first stator section to pass directly through the center of the core to the second stator section. The actuator may include a biasing means such as a spring for returning the permanent magnet means from the second position to the first position.

A major advantage of the actuator according to the present invention is that it develops a substantially constant torque over a wide excursion angle range of 90 degrees or more. The constant torque is developed since the air gap between the stator sections and the permanent magnet means is preferably uniform, and since the magnetic flux passes directly through the center of the core and not through the periphery of the rotor as in prior art devices.

It is a feature and advantage of the present invention to provide a rotary actuator having an excursion angle of about 90 degrees or greater.

It is another feature and advantage of the present invention to provide a rotary actuator that produces constant torque over a wide excursion angle.

It is yet another feature and advantage of the present invention to provide a rotary actuator having a core made of a highly permeable magnetic material to achieve constant torque over a wide excursion angle.

These and other features and advantages of the present invention will be apparent to those skilled in the art from the following detailed description of preferred embodiments and the attached drawings, in which:

DETAILED DESCRIPTION OF THE PREFERRED EMBODIMENTS

Figure 1:
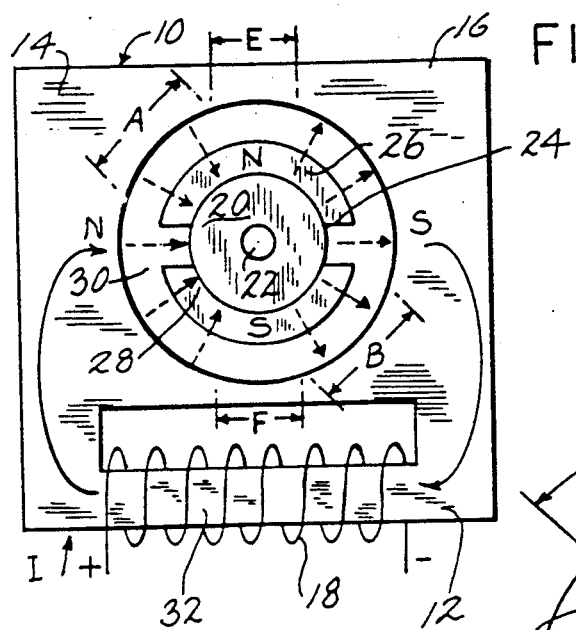
FIG. 1 is a top view of a preferred embodiment of the actuator according to the present invention.

FIG. 1 depicts a preferred embodiment of the present invention. In FIG. 1, actuator 10 has a stator 12 that consists of a first stator section 14 and a second stator section 16. A coil 18 wound on stator 12 produces magnetic flux that travels in the directions indicated by the arrows when coil 18 is energized by a direct current I as indicated in FIG. 1.

Actuator 10 also includes a rotor assembly which consists of a core 20 rotatably mounted on a shaft 22. Core 20 is preferably cylindrical in shape and has an outer surface 24 to which is attached a first arcuate permanent magnet 26 and a second arcuate permanent magnet 28. Core 20 may be made from any highly permeable, low reluctance magnetic material such as soft iron, cold rolled steel or powdered metal. The permanent magnet means, consisting of permanent magnets 26 and 28, may be made from any material having a large remanent magnetism such as an aluminum-nickel alloy or a ceramic material, as long as they produce a relatively constant magnetic field. Magnets 26 and 28 could be replaced by a single ring magnet (not shown), which may be easier to manufacture if magnets 26 and 28 have large arcs. In any event, the permanent magnet means is charged such that a first magnet pole 26 is of a first polarity —indicated as N for North in FIG. 1 —and a second magnet pole 28 is charged to be of a second opposite polarity —indicated as S for South in FIG. 1.

Shaft 22 and its bearing (not shown) are made from a non-magnetic material to prevent the magnetic flux field from disrupting shaft rotation.

Stator 12 is also made from a low reluctance, highly permeable material like that used for core 20. The air gap 30 between stator sections 14 and 24 on the one hand and the permanent magnets 26 and 28 on the other hand is preferably substantially uniform and is between about 0.010 to 0.040 inches wide, with a gap of 0.020 inches being particularly desirable.

Coil 18 preferably has 600 turns of 25 gauge wire, with stator section 32 on which coil 18 is wound being square-shaped in cross-section, each side of the square having a length of ½ inches. The current I applied to coil 18 may be any current up to that which would cause stator 12 to be saturated.

Figure 2:
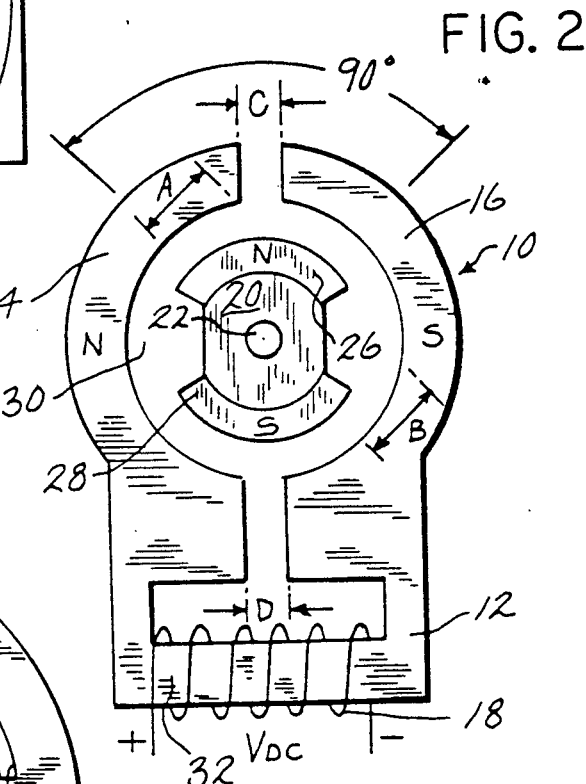
FIG. 2 is a top view of a second embodiment having air gaps between the stator sections.
Figure 3:
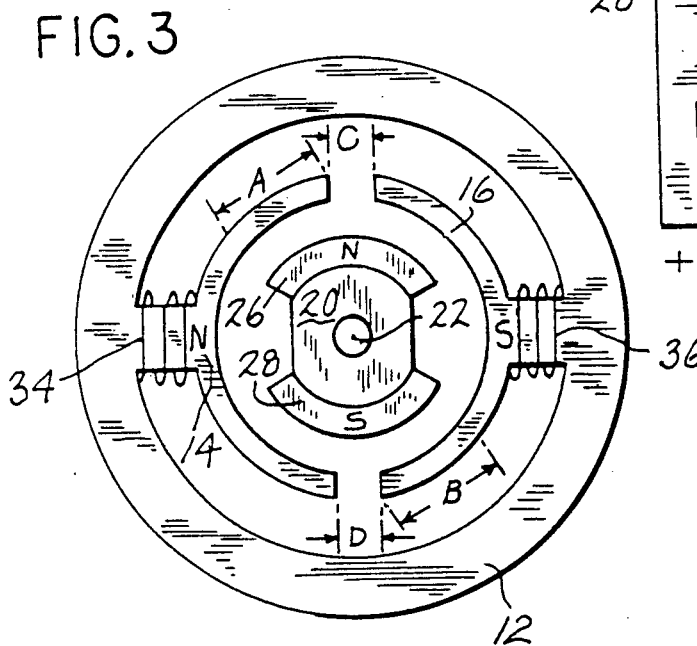
FIG. 3 is a top view of a third embodiment using two coils.
Figure 4:
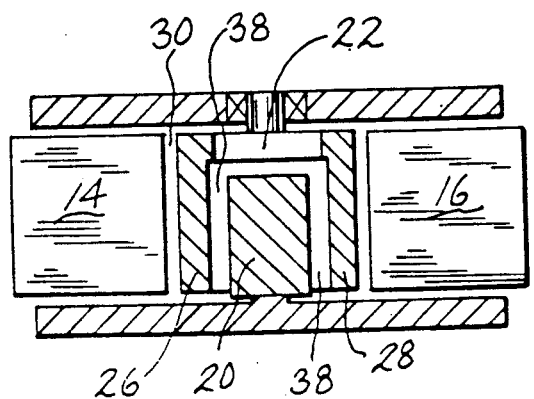
FIG. 4 is a side cross-sectional view of a fourth embodiment having a stationary core.

The actuator depicted in FIG. 1 as well as in the other FIGS. 2-4 may be referred to as a limited angle torque (LAT) motor if it contains a biasing means such as a spring (not shown) having a sufficient spring rate to return the rotor assembly to its original position. The actuator may be referred to as a constant torque rotary solenoid if no such biasing means is used. The constant torque feature of the rotary solenoid according to the present invention enables it to pull in a shaft at a constant rate, overcoming the typical prior art disadvantage that the pull-in rate increases with time.

The actuator according to the present invention may be used in a much wider variety of applications than prior art limited torque angle actuators. For example, the wide excursion range of the present actuator allows it to be used to position the throttle plate from 0 to 90 degrees in an internal combustion engine governor. Other applications include a current meter, a voltage meter (with proper shunting), a rotary solenoid as discussed above, and a wide variety of automation applications where positioning is required.

The operation of the embodiment depicted in FIG. 1 will now be described. When current is flowing through coil winding 18, first stator section 14 becomes a first stator pole of a first polarity (here North), and second stator section 16 becomes a second stator pole of an opposite, second polarity (depicted as S or South in FIG. 1). The first stator pole repels the pole of the same polarity to which magnet 26 is charged; similarly, the second stator pole repels the second magnet pole, magnet 28. Also, poles of opposite polarity attract each other.

In the area marked A, the North-North repulsion between the first stator pole and the first magnet pole tends to force magnet 26 radially inward toward shaft 22. Similarly, the South-South repulsion between the South stator pole and the second or South magnet pole in area B tends to push magnet 28 radially inward toward shaft 22 to oppose the North-North repulsion discussed above. Thus, the resultant force in areas A and B is zero.

In area E, the fringing flux at the fringe of first stator section 14 causes rotational motion in a clockwise direction due to the North-North repulsion between the first stator pole and magnet 26, and due to the North-South attraction between the first magnet pole 26 and the second stator pole respectively. In area F, clockwise rotation is caused by the South-South repulsion forces between the second stator pole and the second magnet pole 28, and by the South-North attraction resulting from the interaction between the second magnet pole and the first stator pole respectively.

The actuator according to the present invention produces a greater torque than typical prior art toroidally-wound LAT motors because the air gap in the present invention is easily reduced in size. In typical toroidally-wound LAT motors, the coil is located between the stator and the rotor, thereby preventing the air gap from being greatly reduced. Moreover, the present invention has a greater heat dissipation since the stator may be attached to a heat sink.

The actuator according to the present invention is also an improvement over typical slotted armature LAT motors since the slotted armature design causes ripple torque and cogging, preventing constant torque throughout the excursion range.

The embodiment depicted in FIG. 2 is similar to the embodiment depicted in FIG. 1 except that areas C and D in FIG. 2 comprise actual air gaps whereas in FIG. 1 areas E and F are fringe flux regions connecting first stator section 14 and second stator section 16. In FIG. 2, the widths of areas C and D should be the same; these widths should be sufficiently large to prevent the shorting of flux from first stator section 14 to second stator section 16, but should be sufficiently narrow so that they do not limit the rotation of the rotor assembly.

The actuator in FIG. 2 operates in the same manner as the actuator in FIG. 1. In FIGS. 1-4, components having similar functions have been given the same designations, it being understood that the actual specifications for the components may differ in the different figures.

FIG. 3 depicts a third embodiment of the present invention in which two coils 34 and 36 are used in place of the single coil 18 in FIGS. 1 and 2. In FIG. 3, first coil 34 is wound so that it is in magnetic flux communication with first stator section 14. Likewise, second coil 36 is wound such that it is in magnetic flux communication with second stator section 16. Coils 34 and 36 each consist of 300 turns of 25 gauge wire.

FIG. 4 is a side cross-sectional view of a fourth embodiment of the present invention. The embodiment depicted in FIG. 4 differs from the embodiments depicted in FIGS. 1-3 in that core 20 in FIG. 4 is stationary. Permanent magnets 26 and 28 are attached to shaft 22 and rotate therewith. Magnets 26 and 28 are spaced from the outer surface of core 20 to create an air gap 38 therebetween. The preferred dimensions of air gap 38 are similar to those for air gap 30 discussed above. Although the presence of air gap 38 may reduce the torque output of the actuator, the configuration of FIG. 4 has a quicker response since the inertia of the rotating components is reduced due to the fact that core 20 is stationary. The embodiment depicted in FIG. 4 otherwise operates in a manner similar to the embodiments depicted and described in connection with FIGS. 1-3 above.

While several preferred embodiments of the present invention have been shown and described, alternate embodiments will be apparent to those skilled in the art and are within the intended scope of the present invention. Therefore, the invention is to be limited only by the following claims.

What is claimed is:

1. An actuator, comprising:
    a stationary core made from a highly permeable magnetic material and having an outer surface;
    a stator spaced from said core and including first and second stator sections on opposite sides of said core, said first and second stator sections having magnetic material; and
    permanent magnet means having a first magnet pole of a first polarity and having a second magnet pole of an opposite second polarity, said permanent magnet means being spaced from the outer surface of said core to create an air gap between said core and said magnet means, said permanent magnet means for magnetically interacting with said first and second stator sections;
    means for rotating said permanent magnet means from a first position to a second position; and
    electrical means for magnetizing said first and second stator sections such that said first stator section becomes a first stator pole of said first polarity that attracts said second magnet pole, and said second stator section becomes a second stator pole of said second polarity that attracts said first magnet pole.

2. The actuator of claim 1, further comprising:
    biasing means for moving said permanent magnet means from said second position to said first position.

3. The actuator of claim 1 wherein said core is made of soft iron.

4. The actuator of claim 1, wherein said core is substantially cylindrical in shape.

5. The actuator of claim 1 wherein said permanent magnet means comprises two arcuate magnets of opposite polarity.

6. The actuator of claim 1, wherein said permanent magnet means includes a ring magnet.

7. The actuator of claim 1, wherein said rotating means includes a bearing made from a high reluctance material.

8. The actuator of claim 1 wherein said electrical means includes at least one coil wound on said stator.

9. The actuator of claim 1, wherein said electrical means includes:
    a first coil in magnetic flux communication with said first stator section; and
    a second coil in magnetic flux, communication with said second stator section.

10. The actuator of claim 9, wherein said first coil and said second coil are connected in series.

* * * * *